(12) United States Patent
Kuroda et al.

(10) Patent No.: US 8,135,343 B2
(45) Date of Patent: Mar. 13, 2012

(54) INFORMATION MANAGEMENT APPARATUS, METHOD, AND COMPUTER PROGRAM PRODUCT, AND COMMUNICATION PROCESSING APPARATUS, METHOD, AND COMPUTER PROGRAM PRODUCT

(75) Inventors: Seiji Kuroda, Kanagawa (JP); Isao Soma, Saitama (JP); Yasuharu Ishikawa, Kanagawa (JP); Kazuo Takada, Chiba (JP); Yoshihiro Yoneda, Kanagawa (JP); Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 12/480,295

(22) Filed: Jun. 8, 2009

(65) Prior Publication Data
US 2009/0305630 A1 Dec. 10, 2009

(30) Foreign Application Priority Data

Jun. 9, 2008 (JP) .................................. 2008-150149

(51) Int. Cl.
*H04B 5/00* (2006.01)
(52) U.S. Cl. ..................... 455/41.1; 455/41.2; 455/435.1
(58) Field of Classification Search ............... 455/456.5, 455/41.1, 41.2, 424, 41.3, 435.1, 411, 414.1, 455/456.3, 566, 574, 507; 370/352, 395.2, 370/395.65, 401; 709/218, 228, 227, 249; 358/1.15, 452; 707/100; 700/292, 297; 705/39, 705/75, 79; 726/3, 26, 24

See application file for complete search history.

(56) References Cited

U.S. PATENT DOCUMENTS

| | | | | |
|---|---|---|---|---|
| 7,298,733 | B2 * | 11/2007 | Sakai et al. | 370/352 |
| 2004/0243712 | A1 * | 12/2004 | Sakai et al. | 709/227 |
| 2007/0171482 | A1 * | 7/2007 | Iwasaki | 358/452 |
| 2008/0154597 | A1 * | 6/2008 | Kawahara et al. | 704/246 |
| 2010/0067052 | A1 * | 3/2010 | Iwasaki | 358/1.15 |
| 2010/0167787 | A1 * | 7/2010 | Weisbrod | 455/566 |
| 2011/0207403 | A1 * | 8/2011 | Kim et al. | 455/41.1 |

FOREIGN PATENT DOCUMENTS

JP 2007-110616 4/2007

* cited by examiner

*Primary Examiner* — Tan Trinh
(74) *Attorney, Agent, or Firm* — K&L Gates LLP

(57) ABSTRACT

An information management apparatus includes a communication unit configured to receive, from a plurality of communication processing apparatuses, a plurality of pieces of communication history data of near-field communication performed in the plurality of communication processing apparatuses; a data comparison unit configured to perform comparison of the plurality of pieces of communication history data received by the communication unit; and a data registration unit configured to register a plurality of pieces of user information associated with the plurality of communication processing apparatuses as a group in a database on condition that it is verified by the data comparison unit, in accordance with the plurality of pieces of communication history data of the near-field communication, that near-field communication has been performed between the plurality of communication processing apparatuses.

6 Claims, 6 Drawing Sheets

INFORMATION MANAGEMENT APPARATUS, METHOD, AND COMPUTER PROGRAM PRODUCT, AND COMMUNICATION PROCESSING APPARATUS, METHOD, AND COMPUTER PROGRAM PRODUCT

CROSS REFERENCES TO RELATED APPLICATIONS

The present application claims priority to Japanese Priority Patent Application JP 2008-150149 filed in the Japan Patent Office on Jun. 9, 2008, the entire content of which is hereby incorporated by reference.

BACKGROUND

The present application relates to an information management apparatus, method, and computer program product, and a communication processing apparatus, method, and computer program product, and more particularly, to an information management apparatus, method, and computer program product, and a communication processing apparatus, method, and computer program product that are applied to building and management of a social network service (SNS) community or the like.

Recently, communications through networks have been actively performed. For example, a community building service, such as an SNS, is a service provided through a network. An SNS is described, for example, in Japanese Unexamined Patent Application Publication No. 2007-110616.

In this community building service, by registering user information including, for example, a profile of a user on a website which provides the community building service and making the user information public, the user can communicate, through a network, with many users who access the site.

The community building service such as an SNS causes, for example, the following problems:
- a site similar to a blog site for keeping personal diaries is unintentionally provided
- a closed community made up of exclusive members becomes an open community including a randomly increasing number of users who join the community
- the number of ghost users increases because one user uses two or more IDs
- a dating site is unintentionally provided In addition, the following problems may arise because an SNS community uses a network:
- users do not see each other's faces
- a large number of ghost members exist The above-mentioned problems do not occur if an SNS community is made up of well-meaning users. However, in actuality, users who have various bad intentions can join the community. It is thus difficult to avoid the above-mentioned problems.

SUMMARY

It is desirable to provide an information management apparatus, method, and computer program product, and, a communication processing apparatus, method, and computer program product that avoid negative effects such as an increase in the number of ghost members and maintain the order of a community by limiting who may join the community.

An information management apparatus according to a first embodiment includes a communication unit configured to receive, from a plurality of communication processing apparatuses, a plurality of pieces of communication history data of near-field communication performed in the plurality of communication processing apparatuses; a data comparison unit configured to perform comparison of the plurality of pieces of communication history data received by the communication unit; and a data registration unit configured to register a plurality of pieces of user information associated with the plurality of communication processing apparatuses as a group in a database on condition that it is verified by the data comparison unit, in accordance with the plurality of pieces of communication history data of the near-field communication, that near-field communication has been performed between the plurality of communication processing apparatuses.

Furthermore, in the information management apparatus, the data comparison unit may be configured to determine, in accordance with, among the plurality of communication processing apparatuses, user IDs of communication processing apparatuses with which other communication processing apparatuses have performed near-field communication, the user IDs being included in a plurality of pieces of communication history data received from the other communication processing apparatuses, whether near-field communication has been performed between the plurality of communication processing apparatuses.

Furthermore, in the information management apparatus, the data comparison unit may be configured to determine, in accordance with whether a plurality of pieces of data of a near-field communication date and time included in the plurality of pieces of communication history data received from the plurality of communication processing apparatuses match each other, whether near-field communication has been performed between the plurality of communication processing apparatuses.

Furthermore, in the information management apparatus, the data comparison unit may be configured to determine, in accordance with whether a plurality of pieces of data of a near-field communication position included in the plurality of pieces of communication history data received from the plurality of communication processing apparatuses match each other, whether near-field communication has been performed between the plurality of communication processing apparatuses.

A communication processing apparatus according to a second embodiment includes a near-field communication unit configured to perform near-field communication; a control unit configured to acquire communication history data of near-field communication performed by using the near-field communication unit; and a storage unit configured to store the communication history data under control of the control unit. The control unit is configured to acquire the communication history data stored in the storage unit and transmit the acquired communication history data to a server that performs information management, when issuing an information registration request to the server.

Furthermore, in the communication processing apparatus, the control unit may be configured to acquire, as the communication history data, identification information on a communication processing apparatus with which near-field communication has been performed, and when issuing the information registration request, transmit the acquired identification information to the server.

Furthermore, in the communication processing apparatus, the control unit may be configured to acquire, as the communication history data, execution date and time information on a date and time when near-field communication was performed, and when issuing the information registration request, transmit the acquired execution date and time information to the server.

Furthermore, in the communication processing apparatus, the control unit may be configured to acquire, as the communication history data, execution position information on a position where near-field communication was performed, and when issuing the information registration request, transmit the acquired execution position information to the server.

An information management method according to a third embodiment performed in an information management apparatus includes the steps of receiving, by using a communication unit, from a plurality of communication processing apparatuses, a plurality of pieces of communication history data of near-field communication performed in the plurality of communication processing apparatuses; performing, by using a data comparison unit, comparison of the received plurality of pieces of communication history data; and registering, by using a data registration unit, a plurality of pieces of user information associated with the plurality of communication processing apparatuses as a group in a database on condition that it is verified, in accordance with the plurality of pieces of communication history data of the near-field communication, that near-field communication has been performed between the plurality of communication processing apparatuses.

A data processing method according to a fourth embodiment performed in a communication processing apparatus includes the steps of performing, by using a near-field communication unit, near-field communication with another communication processing apparatus; acquiring, by using a control unit, communication history data of near-field communication performed by using the near-field communication unit, and storing, by using the control unit, the acquired communication history data in a storage unit; and acquiring, by using the control unit, the communication history data stored in the storage unit and transmitting, by using the control unit, the acquired communication history data to a server that performs information management, when issuing, by using the control unit, an information registration request to the server.

A computer program product according to a fifth embodiment having instructions that when read by a CPU cause an information management apparatus to perform information management processing including the steps of causing a communication unit to receive, from a plurality of communication processing apparatuses, a plurality of pieces of communication history data of near-field communication performed in the plurality of communication processing apparatuses; causing a data comparison unit to perform comparison of the received plurality of pieces of communication history data; and causing a data registration unit to register a plurality of pieces of user information on the plurality of communication processing apparatuses as a group in a database on condition that it is verified, in accordance with the plurality of pieces of communication history data of the near-field communication, that near-field communication has been performed between the plurality of communication processing apparatuses.

A computer program product according to a sixth embodiment having instructions that when read by a CPU cause a communication processing apparatus to perform data processing including the steps of causing a near-field communication unit to perform near-field communication with another communication processing apparatus; causing a control unit to acquire communication history data of near-field communication performed by using the near-field communication unit and to store the acquired communication history data in a storage unit; and causing the control unit to acquire the communication history data stored in the storage unit and to transmit the acquired communication history data to a server that performs information management, when causing the control unit to issue an information registration request to the server.

A computer program product according to an embodiment is, for example, a computer program that can be provided for a computer system capable of executing various types of program code in the form of a computer-readable storage medium or a communication medium. Such a program is provided in the computer-readable form, thereby implementing processing in accordance with the program on the computer system.

Further features, and advantages will become apparent from the following detailed description based on embodiments and the accompanying drawings. Note that the system referred to in the description represents a structure of a logical set of a plurality of apparatuses, and the apparatuses having individual configurations are not necessarily contained in a single housing.

According to a feature of an embodiment, a plurality of pieces of communication history data of near-field communication performed in a plurality of communication processing apparatuses are received from the plurality of communication processing apparatuses, and comparison of the received plurality of pieces of communication history data is performed. On condition that it is verified that near-field communication has been performed between the plurality of communication processing apparatuses, users of the plurality of communication processing apparatuses are registered as community members. Each of the plurality of pieces of communication history data acquired and subjected to comparison is information on an ID of an apparatus with which communication has been performed, a communication date and time, a communication execution position, and the like. On condition that it is verified, in accordance with the data, that near-field communication has actually been performed, registration as members of a community can be performed. With this processing, registration of a user, such as a ghost user, who actually does not exist can be avoided.

Additional features and advantages are described in, and will be apparent from, the following Detailed Description and the figures.

DETAILED DESCRIPTION

An information management apparatus, method, and computer program product, and a communication processing apparatus, method, and computer program product according to an embodiment will be described in detail with reference to the drawings.

According to an embodiment, negative effects such as an increase in the number of ghost members can be avoided and the order of a community can be maintained by limiting who may join the community. In community management processing in an embodiment, there is a restriction upon who may join the community in accordance with the following conditions:

(a) to have met a registered user in the real world
(b) to have been to a particular place or venue
(c) to have joined an event such as a particular meeting or party For example, users who satisfy any of conditions (a) to (c) are permitted to join the community.

Figure 1:
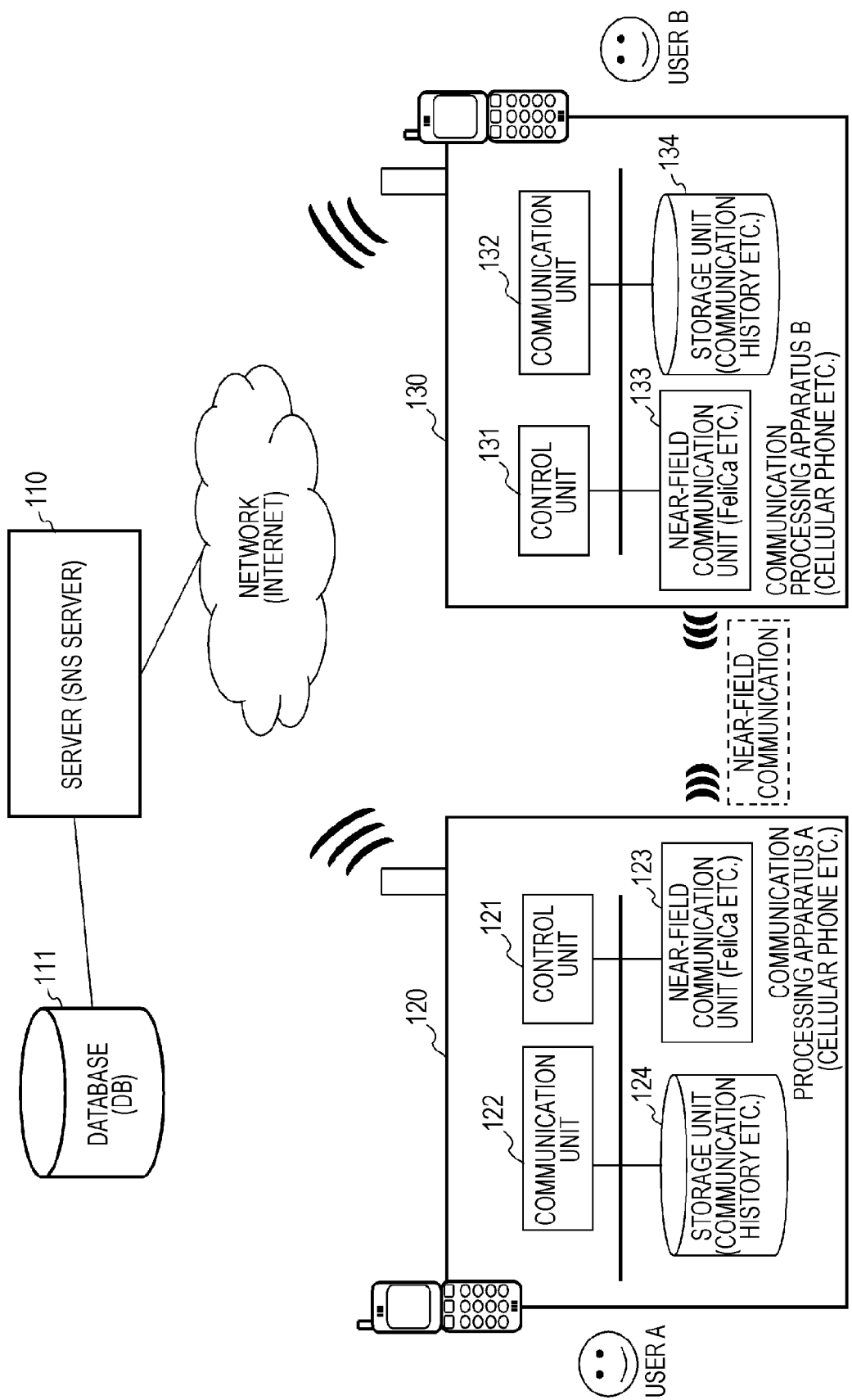
FIG. 1 is an explanatory diagram showing an example of the configuration of a communication management system according to an embodiment.

An example of the entire configuration of a community management system according to an embodiment will be described with reference to FIG. 1. FIG. 1 illustrates a server 110 which provides a website for building an SNS community or the like and performs community management processing, a communication processing apparatus A 120 owned by a user A, and a communication processing apparatus B 130 owned by a user B, the users A and B joining the community.

The server 110 and each of the communication processing apparatus A 120 and the communication processing apparatus B 130 are capable of communicating with each other through a network such as the Internet. The server 110 includes a database 111 in which community management information including information on users who join the community, such as user IDs as user identifiers, is stored.

Only the communication processing apparatuses A and B owned by the users A and B, respectively, are shown in FIG. 1 as representative examples. However, a large number of users join the community, and many communication processing apparatuses owned by the users who join the community can also perform communications through the network.

In the example shown in FIG. 1, both the communication processing apparatuses A 120 and B 130 are cellular phones. However, a communication processing apparatus according to an embodiment is not necessarily a cellular phone. For example, a communication processing apparatus according to an embodiment may be an apparatus such as a personal computer (PC).

The configuration of the communication processing apparatus A 120 will now be described. As shown in FIG. 1, the communication processing apparatus A 120 includes a control unit 121, a communication unit 122, a near-field communication unit 123, and a storage unit 124. The control unit 121 controls various data processing and data communication operations performed in the communication processing apparatus A 120. The communication unit 122 performs communication through a network such as the Internet.

The near-field communication unit 123 performs near-field communication (for example, near-field communication conforming to near-field communication (NFC) standards) with another communication processing apparatus such as the communication processing apparatus B 130. Identification information (ID) of the communication processing apparatus A 120, programs and parameters used for various data processing and data communication operations performed in the communication processing apparatus A 120, communication history information, and the like are stored in the storage unit 124. Note that the near-field communication unit 123 employs, for example, FeliCa® technology, which is a near-field communication technology developed by Sony Corporation.

The control unit 121 of the communication processing apparatus 120 shown in FIG. 1 acquires communication history data of near-field communication performed by using the near-field communication unit 123, and stores the acquired communication history data in the storage unit 124. In addition, when issuing a community member registration request to the server 110 that performs community management, the control unit 121 acquires communication history data (identification information on an apparatus with which near-field communication has been performed, information on the date and time on which near-field communication was performed, information on the position where near-field communication was performed, and the like) stored in the storage unit 124, and transmits the acquired communication history data to the server 110. The details of the processing will be described later in detail.

Referring to FIG. 1, the communication processing apparatus B 130 has a configuration similar to that of the communication processing apparatus A 120. The communication processing apparatus B 130 includes a control unit 131, a communication unit 132, a near-field communication unit 133, and a storage unit 134. The configuration shown in FIG. 1 shows the minimum necessary functions as a communication processing apparatus according to an embodiment. As described above, a communication processing apparatus according to an embodiment may be a cellular phone, a PC, or the like. The configuration of the communication processing apparatus differs in accordance with the components of the apparatus.

In the configuration shown in FIG. 1, communication between the server 110 and the communication processing apparatus A 120 and communication between the server 110 and the communication processing apparatus B 130 are performed through a network such as the Internet. Meanwhile, communication between the communication processing apparatus A 120 and the communication processing apparatus B 130 is performed as near-field communication through the near-field communication unit 123 of the communication processing apparatus A 120 and the near-field communication unit 133 of the communication processing apparatus B 130. In this case, the range in which near-field communication can be performed is at most several meters. Thus, it is necessary for the users A and B to see each other and perform communication by bringing the communication processing apparatuses A 120 and B 130 near each other. Communication histories of the near-field communication are stored in the storage unit 124 of the communication processing apparatus A 120 and the storage unit 134 of the communication processing apparatus B 130.

Figure 2:
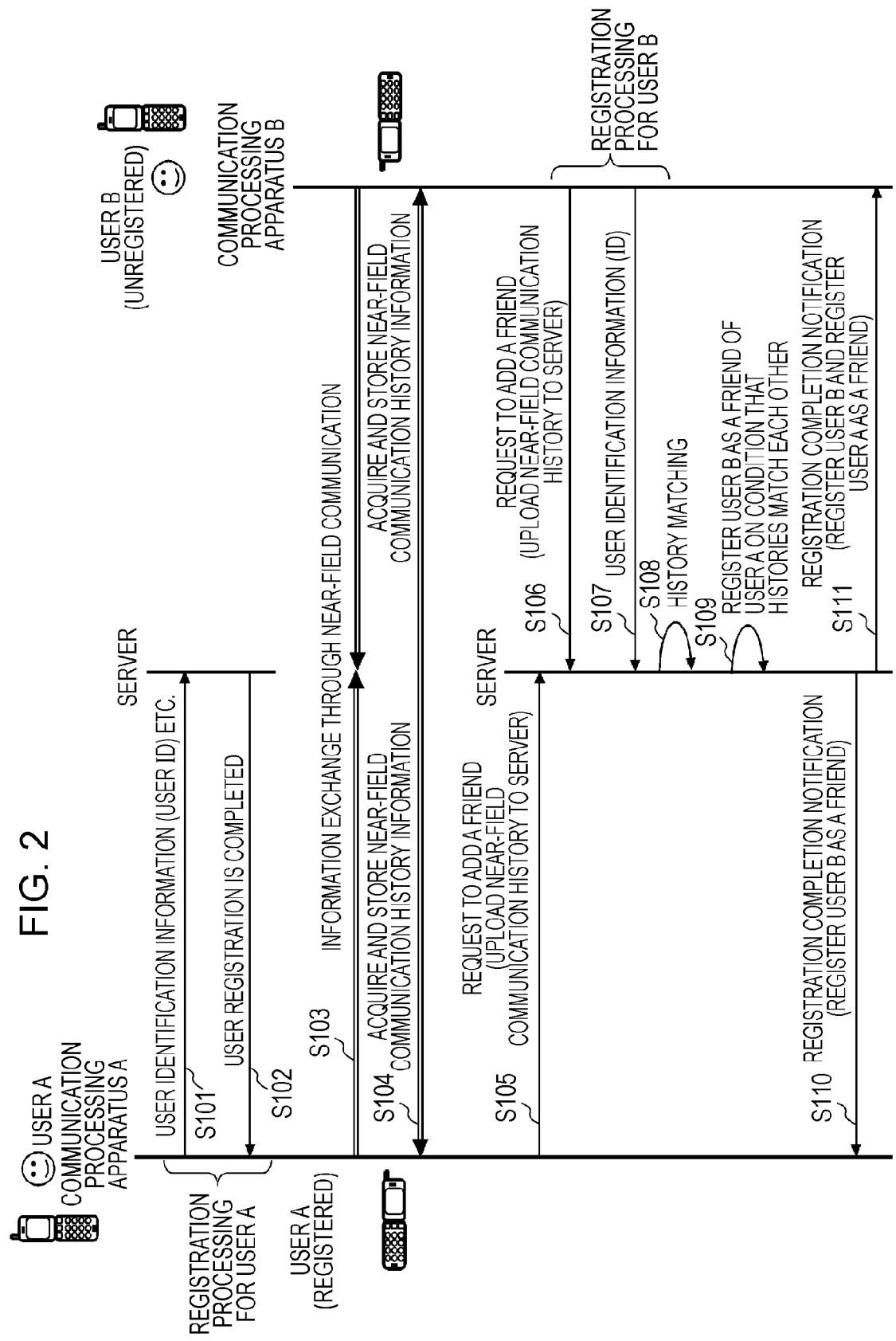
FIG. 2 is an explanatory diagram showing a processing sequence according to an embodiment in which a community member is registered.

A plurality of examples of a user registration processing sequence to a community in an embodiment will be explained with reference to sequence diagrams shown in FIGS. 2 to 5. For example, the following plurality of processing examples are considered:

(1) processing sequence in which a user B is registered as a community member on condition that the user B meets in the real world a user A who is registered as a community member (see FIG. 2)

Figure 3:
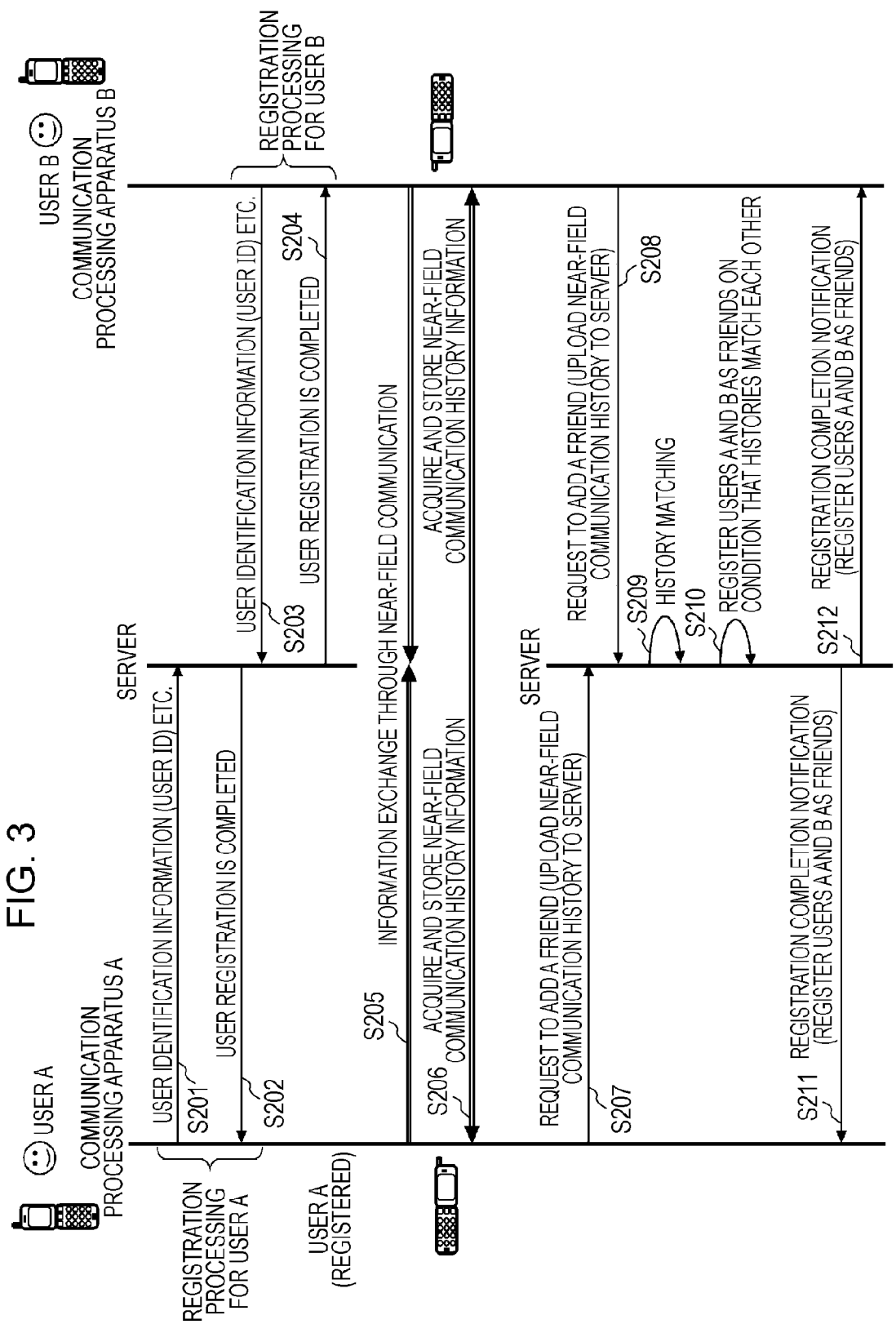
FIG. 3 is an explanatory diagram showing a processing sequence according to an embodiment in which a community member is registered.

(2) processing sequence in which users A and B who are registered as community members are registered as members of a particular group (friend) of community members on condition that both the users A and B meet each other in the real world (see FIG. 3)

Figure 4:
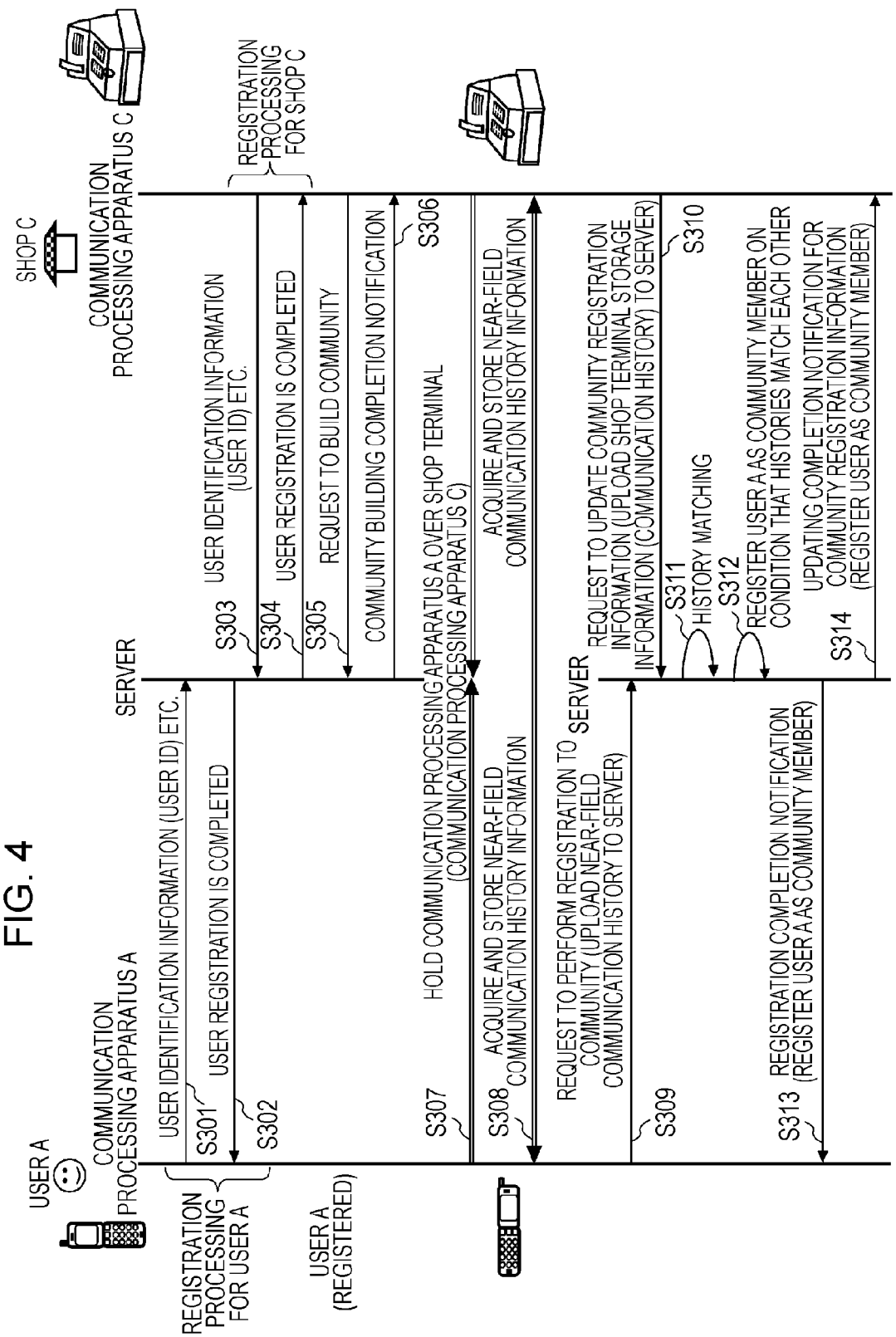
FIG. 4 is an explanatory diagram showing a processing sequence according to an embodiment in which a community member is registered.

(3) processing sequence in which only a user who has been to a shop is permitted to be registered as a member of a community established by the shop (see FIG. 4)

Figure 5:
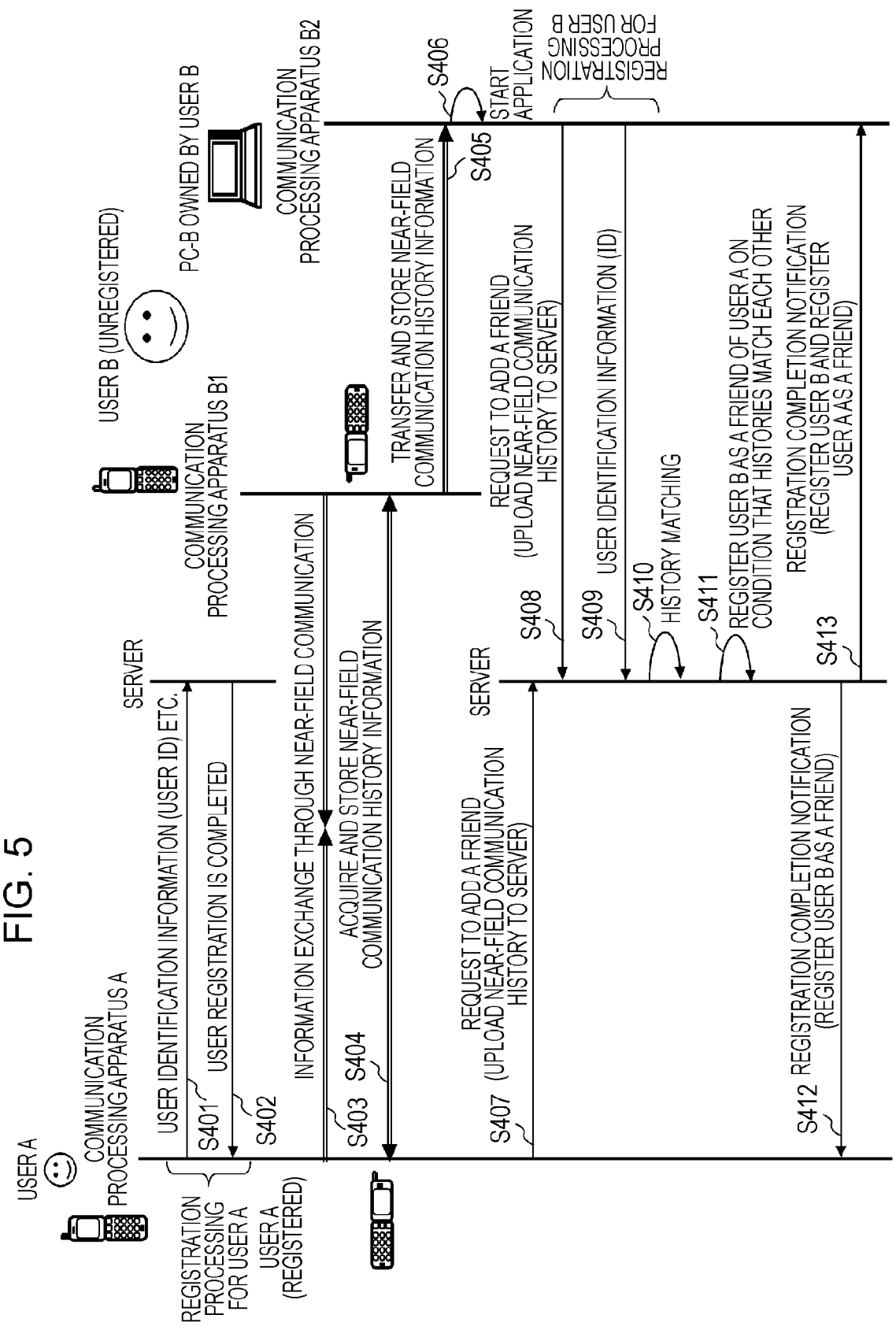
FIG. 5 is an explanatory diagram showing a processing sequence according to an embodiment in which a community member is registered.

(4) processing sequence in which near-field communication history information is transferred between a plurality of communication processing apparatuses (for example, a cellular phone and a PC) owned by a user and transfer information is used (see FIG. 5)

The processing sequences (1) to (4) will be explained below in order.

(1) Processing sequence in which a user B is registered as a community member on condition that the user B meets in the real world a user A who is registered as a community member (see FIG. 2)

First, the processing sequence in which a user B is registered as a community member on condition that the user B meets in the real world a user A who is registered as a community member will be described with reference to FIG. 2.

FIG. 2 shows a communication processing sequence performed among a server that performs management processing for a community, more specifically, that performs registration processing for registering members of the community, and communication processing apparatuses A and B owned by users A and B who are to be registered as community members.

In communication with the server in steps S101 and 102, user registration for the user A is performed. Then, the user B is registered as a "friend" of the user A. Here, "friend" is one category of members who join the community.

An overview of a processing sequence for registering the user B as a new community member is as described below.

The user B meets in the real world the user A who has been registered as a community member and near-field communication is performed between the communication processing apparatuses A and B owned by the users A and B.

The server acquires communication history information on the near-field communication from each of the communication processing apparatuses A and B, and compares the communication history information acquired from the communication processing apparatus A with the communication history information acquired from the communication processing apparatus B.

On condition that the communication history information received from the communication processing apparatus A matches the communication history information received from the communication processing apparatus B and verification is successful, the user B is registered as a community member (for example, a "friend" of the user A).

In this processing example, only a user who satisfies condition (a): to have met a registered user in the real world, can be registered as a new member.

Processing steps of the sequence diagram shown in FIG. 2 will be explained.

Processing of steps S101 to 102 is registration processing for the user A performed in accordance with communication processing performed between the communication processing apparatus A owned by the user A and the server. The registration processing for the user A is performed, for example, as processing for registering an initial member of the community. Predetermined user verification processing is performed, and user registration is performed. Such a registration sequence for registering an initial member is different from a registration sequence for registering the user B, which will be described later. Thus, it is desirable that only a predetermined limited number of members be registered as initial members.

The registration sequence for registering the user A is as described below. In step S101, the user A transmits, by using the communication processing apparatus A, predetermined user information including user identification information (user ID) to the server. The server performs a predetermined user verification sequence in accordance with the user information including the user identification information (user ID) received from the communication processing apparatus A. In a case where it is determined that the user A satisfies a registration requirement, the server stores the user information including the user identification information in the database, and performs processing for registering the user A as a community member. After registration is completed, in step S102, the server transmits a registration completion notification to the communication processing apparatus A. The user ID may be an ID corresponding to the user A or an ID corresponding to the communication processing apparatus A.

The processing of step S103 and the subsequent steps is processing for registering a new member (additional member) of the community. In this processing example, in order to avoid registration of a ghost member or the like, only a user who have met in the real world an authorized registered member (in this example, the user A) can be registered.

In step S103, the user A (who has been registered as a community member) and the user B (who has not been registered) meet each other, and near-field communication between the communication processing apparatus A owned by the user A and the communication processing apparatus B owned by the user B is performed. Near-field communication is performed by using the near-field communication units 123 and 133 of the communication processing apparatuses 120 and 130 shown in FIG. 1.

In step S104, the communication processing apparatus A stores, as communication history information, data received from the communication processing apparatus B in the storage unit of the communication processing apparatus A, and the communication processing apparatus B stores, as communication history information, data received from the communication processing apparatus A in the storage unit of the communication processing apparatus B.

In the near-field communication, for example, the following data are transmitted from the communication processing apparatus A to the communication processing apparatus B:

(a) a user ID of the user A (an ID corresponding to the user A or an ID corresponding to the communication processing apparatus A)

(b) a nickname of the user A (any name (handle) set by the user A) corresponding to the user ID (c) data of the date and time when near-field communication was performed (d) information on the position where near-field communication was performed (in a case where the communication processing apparatus is provided with a global positioning system (GPS))

(e) an identifier of a server site (website) registered by the user A (f) access information (uniform resource locator (URL)) on the server site The data (a) to (f) are transmitted from the communication processing apparatus A owned by the user A to the communication processing apparatus B owned by the user B. The communication processing apparatus B stores the received data as communication history information in the storage unit of the communication processing apparatus B. Among the data (a) to (f), only the data (a) and (c) are necessary. The other data are not necessary. However, it is desirable that the other data also be transmitted if the other data can be transmitted.

Meanwhile, in the near-field communication, for example, the following data are transmitted from the communication processing apparatus B to the communication processing apparatus A:

(a) a user ID of the user B (an ID corresponding to the user B or an ID corresponding to the communication processing apparatus B)

(b) a nickname of the user B (any name (handle) set by the user B) corresponding to the user ID (c) data of the date and time when near-field communication was performed (d) information on the position where near-field communication was performed (in a case where the communication processing apparatus is provided with a GPS)

The data (a) to (d) are transmitted from the communication processing apparatus B owned by the user B to the communication processing apparatus A owned by the user A. The communication processing apparatus A stores the received data as communication history information in the storage unit of the communication processing apparatus A. Among the data (a) to (d), only the data (a) and (c) are necessary. The other data are not necessary. However, it is desirable that the other data also be transmitted if the other data can be transmitted.

After near-field communication between the communication processing apparatus A and the communication processing apparatus B is performed, the processing of step S105 and the subsequent steps is performed.

In step S105, the communication processing apparatus A is connected to the server, and issues to the server a registration request to register the user B as a "friend" of the user A. As described above, "friend" is one category of members who join the community provided and managed by the server. When issuing the registration request, the communication processing apparatus A uploads to the server the communication history data, which is a record of near-field communication with the communication processing apparatus B, stored in the storage unit of the communication processing apparatus A. More specifically, the following data are acquired from the storage unit and transmitted to the server:

(a) the user ID of the user B (b) the nickname of the user B (any name (handle) set by the user B) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

Processing of steps S106 and S107 is performed by the communication processing apparatus B when the communication processing apparatus B is connected to the server. In the processing of steps S106 and S107, the communication processing apparatus B requests the server to perform processing for registering the user B and processing for registering the user A as a "friend" of the user B.

In step S106, the communication processing apparatus B is connected to the server and issues a registration request to the server. When issuing the registration request, the communication processing apparatus B uploads to the server the communication history data, which is a record of near-field communication with the communication processing apparatus A, stored in the storage unit of the communication processing apparatus B. More specifically, the following data are acquired from the storage unit and transmitted to the server:

(a) the user ID of the user A (b) the nickname of the user A (any name (handle) set by the user A) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

Furthermore, in step S107, the communication processing apparatus B is connected to the server, and transmits identification information (user ID) of the user B to the server. The user ID is an ID corresponding to the user B or an ID corresponding to the communication processing apparatus B. Accordingly, in steps S106 to 107, the communication processing apparatus B requests the server to perform processing for registering the user B and processing for registering the user A as a "friend" of the user B.

In step S108, the server compares the communication history data, which is a record of near-field communication, received from the communication processing apparatus A with the communication history data, which is a record of near-field communication, received from the communication processing apparatus B.

The comparison processing includes, for example, the following data verification processing:

(x) verifying that the communication date and time recorded in the communication history data received from the communication processing apparatus A matches the communication date and time recorded in the communication history data received from the communication processing apparatus B (y) verifying that the user ID recorded in the communication history data received from the communication processing apparatus A is the same as the user ID corresponding to the user B (or the communication processing apparatus B) received from the communication processing apparatus B and that the user ID recorded in the communication history data received from the communication processing apparatus B is the same as the user ID corresponding to the registered user A (or the communication processing apparatus A)

In step S108, the server performs the data verification processing (x) and (y). For example, in a case where information on the position where near-field communication was performed has been received from each of the communication processing apparatuses A and B, the server checks whether the positional information received from the communication processing apparatus A matches the positional information received from the communication processing apparatus B. Furthermore, if other data that can be subjected to comparison have been received, the server performs comparison of the data.

As described above, in step S108, by comparing the data received from the communication processing apparatus A with the data received from the communication processing apparatus B, the server checks whether near-field communication has been performed between the communication processing apparatus A and the communication processing apparatus B.

In a case where verification in step S108 is successful and it is verified that near-field communication has been performed between the communication processing apparatus A and the communication apparatus B, the server registers the user B as a "friend" of the user A in step S109.

In step S110, the server transmits, to the communication processing apparatus A, a registration completion notification indicating that the user B has been registered as a "friend" of the user A. In step S111, the server transmits, to the communication processing apparatus B, a registration completion notification indicating that the user B has been registered as a "friend" of the user A.

In the above description, the registration processing for the user A in steps S101 to 102 is performed as processing for registering an initial member of the community. However, this registration processing is not necessarily normal registration processing. The processing of steps S101 to S102 may be performed as interim registration processing for the user A and normal registration for the user A may be performed on condition that the sequence of steps S103 to S109 is completed. With such processing, meeting a registered user (in this case, the user B) in the real world is set as a requirement for user registration for the user A.

(2) Processing sequence in which users A and B who are registered as community members are registered as members of a particular group (friend) of community members on condition that both the users A and B meet each other in the real world (see FIG. 3)

Next, a processing sequence in which users A and B who are registered as community members are registered as members of a particular group (friend) of community members on condition that both the users A and B meet each other in the real world will be explained with reference to FIG. 3.

In the sequence shown in FIG. 2, the user B who is not registered as a community member is directly registered as a "friend", which is one category of community members. In the sequence shown in FIG. 3, similarly to the user A, initial registration as a community member is performed for the user B. After that, the user B is registered as an upgraded member as a "friend", which is one category group of community members, on condition that the user B meets the user A in the real world.

That is, in this processing example, even though both initial members and members registered as "friends" are members of a community, the initial members and the members registered as "friends" are distinguished from each other as different types of members.

As in FIG. 2, FIG. 3 shows a communication processing sequence performed among a server that performs management processing for a community, more specifically, that performs registration processing for registering members of the community, and communication processing apparatuses A and B owned by users A and B who are to be registered as community members.

Processing steps in the sequence diagram shown in FIG. 3 will be explained.

Processing of steps S201 to 202 is registration processing for the user A performed in accordance with communication processing performed between the communication processing apparatus A owned by the user A and the server. This registration processing for the user A is, for example, registration as an initial member of the community, but is not registration as a "friend".

The registration sequence for registering the user A is as described below. In step S201, the user A transmits, by using the communication processing apparatus A, predetermined user information including user identification information (user ID) to the server. The server performs a predetermined user verification sequence in accordance with the user information including the user identification information (user ID) received from the communication processing apparatus A. In a case where it is determined that the user A satisfies a registration requirement, the server stores the user information including the user identification information in the database, and performs processing for registering the user A as a community member. After registration is completed, in step S202, the server transmits a registration completion notification to the communication processing apparatus A. The user ID may be an ID corresponding to the user A or an ID corresponding to the communication processing apparatus A.

Processing of steps S203 to S204 is registration processing for the user B performed in accordance with communication processing performed between the communication processing apparatus B owned by the user B and the server. This registration processing for the user B is also, for example, registration as an initial member of the community, but is not registration as a "friend". Since the processing of steps S203 to S204 is similar to the processing of steps S201 to 202 described above, the description of the processing of steps S203 to 204 will be omitted.

After the processing of steps S201 to S204 is performed, the processing of step S205 and the subsequent steps is performed, and registration of each user as a "friend" is performed.

In step S205, the user A (initial member) and the user B (initial member) meet each other, and near-field communication is performed between the communication processing apparatus A owned by the user A and the communication processing apparatus B owned by the user B. Near-field communication is performed by using the near-field communication units 123 and 133 of the communication processing apparatuses 120 and 130 shown in FIG. 1.

In step S206, the communication processing apparatus A stores, as communication history information, data received from the communication processing apparatus B in the storage unit of the communication processing apparatus A, and the communication processing apparatus B stores, as communication history information, data received from the communication processing apparatus A in the storage unit of the communication processing apparatus B.

In the near-field communication, for example, the following data are transmitted from the communication processing apparatus A to the communication processing apparatus B, as in the processing sequence shown in FIG. 2:

(a) a user ID of the user A (an ID corresponding to the user A or an ID corresponding to the communication processing apparatus A)

(b) a nickname of the user A (any name (handle) set by the user A) corresponding to the user ID (c) data of the date and time when near-field communication was performed (d) information on the position where near-field communication was performed (in a case where the communication processing apparatus is provided with a GPS)

(e) an identifier of a server site (website) registered by the user A (f) access information (URL) on the server site The data (a) to (f) are transmitted from the communication processing apparatus A owned by the user A to the communication processing apparatus B owned by the user B. The communication processing apparatus B stores the received data as communication history information in the storage unit of the communication processing apparatus B. Among the data (a) to (f), only the data (a) and (c) are necessary. The other data are not necessary. However, it is desirable that the other data also be transmitted if the other data can be transmitted.

Meanwhile, in the near-field communication, for example, the following data are transmitted from the communication processing apparatus B to the communication processing apparatus A:

(a) a user ID of the user B (an ID corresponding to the user B or an ID corresponding to the communication processing apparatus B)

(b) a nickname of the user B (any name (handle) set by the user B) corresponding to the user ID (c) data of the date and time when near-field communication was performed (d) information on the position where near-field communication was performed (in a case where the communication processing apparatus is provided with a GPS)

The data (a) to (d) are transmitted from the communication processing apparatus B owned by the user B to the communication processing apparatus A owned by the user A. The communication processing apparatus A stores the received data as communication history information in the storage unit of the communication processing apparatus A. Among the data (a) to (d), only the data (a) and (c) are necessary. The other data are not necessary. However, it is desirable that the other data also be transmitted if the other data can be transmitted.

After near-field communication between the communication processing apparatus A and the communication processing apparatus B is performed, the processing of step S207 and the subsequent steps is performed.

In step S207, the communication processing apparatus A is connected to the server, and issues to the server a registration request to register the user B as a "friend" of the user A. As described above, "friend" is one category of members who join the community provided and managed by the server, and a member registered as a "friend" is distinguished from an "initial member". When issuing the registration request, the communication processing apparatus A uploads to the server the communication history data, which is a record of near-field communication with the communication processing apparatus B, stored in the storage unit of the communication processing apparatus A. More specifically, the following data are acquired from the storage unit and transmitted to the server:

(a) the user ID of the user B (b) the nickname of the user B (any name (handle) set by the user B) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

Meanwhile, in step S208, the communication processing apparatus B is connected to the server, and issues to the server a registration request to register the user A as a "friend" of the user B. When issuing the registration request, the communication processing apparatus B uploads to the server the communication history data, which is a record of near-field communication with the communication processing apparatus A, stored in the storage unit of the communication processing apparatus B. More specifically, the following data are acquired from the storage unit and transmitted to the server:

(a) the user ID of the user A (b) the nickname of the user A (any name (handle) set by the user A) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

In step S209, the server compares the communication history data, which is a record of near-field communication, received from the communication processing apparatus A with the communication history data, which is a record of near-field communication, received from the communication processing apparatus B.

The comparison processing includes, for example, the following data verification processing:

(x) verifying that the communication date and time recorded in the communication history data received from the communication processing apparatus A matches the communication date and time recorded in the communication history data received from the communication processing apparatus B (y) verifying that the user ID recorded in the communication history data received from the communication processing apparatus A is the same as the user ID corresponding to the user B (or the communication processing apparatus B) received from the communication processing apparatus B and that the user ID recorded in the communication history data received from the communication processing apparatus B is the same as the user ID corresponding to the user A (or the communication processing apparatus A)

In step S209, the server performs the data verification processing (x) and (y). For example, in a case where information on the position where near-field communication was performed has been received from each of the communication processing apparatuses A and B, the server checks whether the positional information received from the communication processing apparatus A matches the positional information received from the communication processing apparatus B. Furthermore, if other data that can be subjected to comparison have been received, the server performs comparison of the data.

As described above, in step S209, by comparing the data received from the communication processing apparatus A with the data received from the communication processing apparatus B, the server checks whether near-field communication has been performed between the communication processing apparatus A and the communication processing apparatus B.

In a case where verification in step S209 is successful and it is verified that near-field communication has been performed between the communication processing apparatus A and the communication processing apparatus B, the server registers the users A and B as "friends", which are category members different from initial members, in step S210.

In step S211, the server transmits, to the communication processing apparatus A, a registration completion notification indicating that the users A and B have been registered as "friends". In step S212, the server transmits, to the communication processing apparatus B, a registration completion notification indicating that the users A and B have been registered as "friends".

In the above description, the registration processing for the users A and B in steps S201 to S204 is performed as processing for registering initial members of the community. However, this registration processing is not necessarily normal registration processing. The processing of steps S201 to S204 may be performed as interim registration processing for the users A and B and the users A and B may be registered as authorized members on condition that the sequence of steps S205 to S210 is completed.

(3) Processing sequence in which only a user who has been to a shop is permitted to be registered as a member of a community established by the shop (see FIG. 4)

Next, a processing sequence in which only a user who has been to a shop is permitted to be registered as a member of a community established by the shop will be explained with reference to FIG. 4.

This processing example can be applied to, for example, a service form in which a shop builds a community made up of users who have been to the shop so that the users registered to the community are eligible for benefits to buy products at a discount price.

In a case where a shop builds such a community and performs user registration, the number of ghost members who are registered but not actually visit the shop often increases. In the sequence shown in FIG. 4, an increase in the number of such ghost members is avoided, and only users who have actually been to the shop are permitted to be registered as members.

FIG. 4 shows a communication processing sequence performed among a server that performs management processing for a community, more specifically, that performs registration processing for registering members of the community, a communication processing apparatus C serving as a shop terminal installed in a shop C which builds a community, and a communication processing apparatus A owned by a user A to be registered as a community member. The communication processing apparatus C has a configuration similar to that of each of the communication processing apparatuses A and B shown in FIG. 1.

Processing steps in the sequence diagram shown in FIG. 4 will be explained.

Processing of steps S301 to S302 is registration processing for the user A performed in accordance with communication processing performed between the communication processing apparatus A owned by the user A and the server. This registration processing for the user A is user registration processing to obtain eligibility to join a community managed by the server. This registration processing is not registration as a member of a community built by the shop C. This registration processing is user registration that is necessary as a prerequisite to become a member of a community built by the shop C.

The registration sequence for registering the user A is as described below. In step S301, the user A transmits, by using the communication processing apparatus A, predetermined user information including user identification information (user ID) to the server. The server performs a predetermined user verification sequence in accordance with the user information including the user identification information (user ID) received from the communication processing apparatus A. In a case where it is determined that the user A satisfies a registration requirement, the server stores the user information including the user identification information in the database, and performs processing for registering the user A as a member eligible to join various communities managed by the server. After registration is completed, in step S302, the server transmits a registration completion notification to the communication processing apparatus A. The user ID may be an ID corresponding to the user A or an ID corresponding to the communication processing apparatus A.

Processing of steps S303 to S304 is registration processing for the shop C performed in accordance with communication processing performed between the communication processing apparatus C, which is a shop terminal owned by the shop C, and the server. The registration processing for the shop C is also, for example, registration to obtain eligibility to join a community managed by the server. Since the processing of steps S303 to S304 is similar to the processing of steps S301 to S302 described above, the description of the processing of steps S303 to S304 will be omitted.

Furthermore, in steps S305 to S306, in accordance with the communication processing performed between the communication processing apparatus C serving as a shop terminal and the server, processing for building a community managed by the shop C is performed. A user who obtains eligibility to join a community is able to build a community. In the processing of steps S305 to S306, the shop C builds a community.

In step S305, the communication processing apparatus C serving as a shop terminal issues to the server a request to create a community. When issuing the request, the communication processing apparatus C transmits, to the server, information conforming to the management standards set by the server. After verifying that a predetermined requirement is satisfied, the server creates a community to be managed by the shop C. In step S306, the server transmits, to the communication processing apparatus C owned by the shop C, a community creation completion notification.

The processing of step S307 and the subsequent steps is a registration sequence for registering a member who joins the community managed by the shop C.

In step S307, the user who carries the communication processing apparatus A visits the shop C, and holds the communication processing apparatus A over the communication processing apparatus C serving as a shop terminal installed in the shop C, so that near-field communication between the communication processing apparatus A and the communication processing apparatus C can be performed. The near-field communication performed here is similar to the near-field communication performed by using the near-field communication units 123 and 133 of the communication processing apparatuses 120 and 130 shown in FIG. 1.

In step 308, the communication processing apparatus A stores, as communication history information, data received from the communication processing apparatus C in the storage unit of the communication processing apparatus A, and the communication processing apparatus C stores, as communication history information, data received from the communication processing apparatus A in the storage unit of the communication processing apparatus C.

In the near-field communication, for example, the following data are transmitted from the communication processing apparatus A to the communication processing apparatus C, as in the processing sequence shown in FIG. 2:

(a) a user ID of the user A (an ID corresponding to the user A or an ID corresponding to the communication processing apparatus A)

(b) a nickname of the user A (any name (handle) set by the user A) corresponding to the user ID (c) data of the date and time when near-field communication was performed (d) information on the position where near-field communication was performed (in a case where the communication processing apparatus is provided with a GPS)

(e) an identifier of a server site (website) registered by the user A (f) access information (URL) on the server site The data (a) to (f) are transmitted from the communication processing apparatus A owned by the user A to the communication processing apparatus C installed in the shop C. The communication processing apparatus C stores the received data as communication history information in the storage unit of the communication processing apparatus C. Among the data (a) to (f), only the data (a) and (c) are necessary. The other data are not necessary. However, it is desirable that the other data also be transmitted if the other data can be transmitted.

Meanwhile, in the near-field communication, for example, the following data are transmitted from the communication processing apparatus C to the communication processing apparatus A:

(a) a user ID of the shop C (an ID corresponding to the shop C or an ID corresponding to the communication processing apparatus C)

(b) a nickname of the shop C (any name (handle) set by the shop C) corresponding to the user ID (c) data of the date and time when near-field communication was performed (d) information on the position where near-field communication was performed (in a case where the communication processing apparatus is provided with a GPS)

The data (a) to (d) are transmitted from the communication processing apparatus C to the communication processing apparatus A owned by the user A. The communication processing apparatus A stores the received data as communication history information in the storage unit of the communication processing apparatus A. Among the data (a) to (d), only the data (a) and (c) are necessary. The other data are not necessary. However, it is desirable that the other data also be transmitted if the other data can be transmitted.

After near-field communication between the communication processing apparatus A and the communication processing apparatus C is performed, the processing of step S309 and the subsequent steps is performed.

In step S309, the communication processing apparatus A is connected to the server, and issues to the server a registration request to register the communication processing apparatus A as a member of the community managed by the shop C. When issuing the registration request, the communication processing apparatus A uploads to the server the communication history data, which is a record of near-field communication with the communication processing apparatus C, stored in the storage unit of the communication processing apparatus A. More specifically, the following data are acquired from the storage unit and transmitted to the server:

(a) the user ID of the shop C (b) the nickname of the shop C (any name (handle) set by the shop C) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

Meanwhile, in step S310, the communication processing apparatus C installed in the shop C is connected to the server, and issues to the server an updating request to update registration information on the community managed by the shop C. When issuing the updating request, the communication processing apparatus C uploads to the server the communication history data, which is a record of near-field communication with the communication processing apparatus A, stored in the storage unit of the communication processing apparatus C. More specifically, the following data are acquired from the storage unit and transmitted to the server:

(a) the user ID of the user A (b) the nickname of the user A (any name (handle) set by the user A) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

In step S311, the server compares the communication history data, which is a record of near-field communication, received from the communication processing apparatus A with the communication history data, which is a record of near-field communication, received from the communication processing apparatus C.

The comparison processing includes, for example, the following data verification processing:

(x) verifying that the communication date and time recorded in the communication history data received from the communication processing apparatus A matches the communication date and time recorded in the communication history data received from the communication processing apparatus C (y) verifying that the user ID recorded in the communication history data received from the communication processing apparatus A is the same as the user ID corresponding to the shop C (or the communication processing apparatus C) received from the communication processing apparatus C and that the user ID recorded in the communication history data received from the communication processing apparatus C is the same as the user ID corresponding to the user A (or the communication processing apparatus A)

In step S311, the server performs the data verification processing (x) and (y). For example, in a case where information on the position where near-field communication was performed has been received from each of the communication processing apparatuses A and C, the server checks whether the positional information received from the communication processing apparatus A matches the positional information received from the communication processing apparatus C. Furthermore, if other data that can be subjected to comparison have been received, the server performs comparison of the data.

As described above, in step S311, by comparing the data received from the communication processing apparatus A with the data received from the communication processing apparatus C, the server checks whether near-field communication has been performed between the communication processing apparatus A and the communication processing apparatus C.

In a case where verification in step S311 is successful and it is verified that near-field communication has been performed between the communication processing apparatus A and the communication processing apparatus C, the server registers the user A as a member of the community managed by the shop C in step S312.

In step S313, the server transmits, to the communication processing apparatus A, a registration completion notification indicating that the user A has been registered as a member of the community managed by the shop C. In step S314, the server transmits, to the communication processing apparatus C, a registration completion notification indicating that the user A has been registered as a member of the community managed by the shop C.

In the sequence diagram shown in FIG. 4, first, in steps S301 to S302, registration processing for the user A is performed in accordance with communication processing performed between the communication processing apparatus A owned by the user A and the server. Then, the user A visits the shop C, and near-field communication between the communication processing apparatus A and the communication processing apparatus C serving as a shop terminal is performed in steps S307 to S308. The order of these processing steps may be different from that described above. That is, first, the user A may visit the shop C, and near-field communication between the communication processing apparatus A and the communication processing apparatus C serving as a shop terminal may be performed. Then, registration processing for the user A may be performed in accordance with communication processing performed between the communication processing apparatus A and the server.

(4) Processing sequence in which near-field communication history information is transferred between a plurality of communication processing apparatuses (for example, a cellular phone and a PC) owned by a user and transfer information is used (see FIG. 5)

Next, a processing sequence in which near-field communication history information is transferred between a plurality of communication processing apparatuses (for example, a cellular phone and a PC) owned by a user and transfer information is used will be described with reference to FIG. 5.

FIG. 5 shows a communication processing sequence performed among a server that performs management processing for a community, more specifically, that performs registration processing for registering members of the community, a communication processing apparatus A owned by a user A, and a communication processing apparatus B1 and a communication processing apparatus B2 owned by a user B, the users A and B being to be registered as community members. The communication processing apparatus B1 owned by the user B is, for example, a cellular phone. The communication processing apparatus B2 owned by the user B is, for example, a PC. Each of the communication processing apparatus A, the communication processing apparatus B1, and the communication processing apparatus B2 has a function similar to that of the communication processing apparatus described above with reference to FIG. 1.

In steps S401 to S402, user registration for the user A is performed in accordance with communication with the server. Then, the user B is registered as a "friend" of the user A. Here, "friend" is one category of members who join the community.

As in the processing described with reference to FIG. 2, this processing example is also a processing sequence in which only a user who satisfies the condition "to have met a registered user in the real world" can be newly registered.

Processing steps of the sequence diagram shown in FIG. 5 will be explained.

Processing of steps S401 to S402 is registration processing for the user A performed in accordance with communication processing performed between the communication processing apparatus A owned by the user A and the server. The registration processing for the user A is performed, for example, as processing for registering an initial member of the community. Predetermined user verification processing is performed, and user registration is performed. Such a registration sequence for registering an initial member is different from a registration sequence for registering the user B, which will be described later. Thus, it is desirable that only a predetermined limited number of members be registered as initial members.

The registration sequence for registering the user A is as described below. In step S401, the user A transmits, by using the communication processing apparatus A, predetermined user information including user identification information (user ID) to the server. The server performs a predetermined user verification sequence in accordance with the user information including the user identification information (user ID) received from the communication processing apparatus A. In a case where it is determined that the user A satisfies a registration requirement, the server stores the user information including the user identification information in the database, and performs processing for registering the user A as a community member. After registration is completed, in step S402, the server transmits a registration completion notification to the communication processing apparatus A. The user ID may be an ID corresponding to the user A or an ID corresponding to the communication processing apparatus A.

The processing of step S403 and the subsequent steps is processing for registering a new member (additional member) of the community. In this processing example, in order to avoid registration of a ghost member or the like, only a user who have met in the real world an authorized registered member (in this example, the user A) can be registered.

In step S403, the user A (who has been registered as a community member) and the user B (who has not been registered) meet each other, and near-field communication between the communication processing apparatus A owned by the user A and the communication processing apparatus B1 owned by the user B is performed. Near-field communication is performed by using the near-field communication units 123 and 133 of the communication processing apparatuses 120 and 130 shown in FIG. 1.

In step S404, the communication processing apparatus A stores, as communication history information, data received from the communication processing apparatus B1 in the storage unit of the communication processing apparatus A, and the communication processing apparatus B1 stores, as communication history information, data received from the communication processing apparatus A in the storage unit of the communication processing apparatus B1.

In the near-field communication, for example, the following data are transmitted from the communication processing apparatus A to the communication processing apparatus B1:

(a) a user ID of the user A (an ID corresponding to the user A or an ID corresponding to the communication processing apparatus A)

(b) a nickname of the user A (any name (handle) set by the user A) corresponding to the user ID (c) data of the date and time when near-field communication was performed (d) information on the position where near-field communication was performed (in a case where the communication processing apparatus is provided with a GPS)

(e) an identifier of a server site (website) registered by the user A (f) access information (URL) on the server site The data (a) to (f) are transmitted from the communication processing apparatus A owned by the user A to the communication processing apparatus B1 owned by the user B. The communication processing apparatus B1 stores the received data as communication history information in the storage unit of the communication processing apparatus B1. Among the data (a) to (f), only the data (a) and (c) are necessary. The other data are not necessary. However, it is desirable that the other data also be transmitted if the other data can be transmitted.

Meanwhile, in the near-field communication, for example, the following data are transmitted from the communication processing apparatus B1 to the communication processing apparatus A:

(a) a user ID of the user B (an ID corresponding to the user B or an ID corresponding to the communication processing apparatus B1)

(b) a nickname of the user B (any name (handle) set by the user B) corresponding to the user ID (c) data of the date and time when near-field communication was performed (d) information on the position where near-field communication was performed (in a case where the communication processing apparatus is provided with a GPS)

The data (a) to (d) are transmitted from the communication processing apparatus B1 owned by the user B to the communication processing apparatus A owned by the user A. The communication processing apparatus A stores the received data as communication history information in the storage unit of the communication processing apparatus A. Among the data (a) to (d), only the data (a) and (c) are necessary. The other data are not necessary. However, it is desirable that the other data also be transmitted if the other data can be transmitted.

After near-field communication between the communication processing apparatus A and the communication processing apparatus B1 is performed, the user B brings the communication processing apparatus B1 back home, and near-field communication is performed between the communication processing apparatus B1 and another communication processing apparatus B2, which is, for example, a PC placed in the home of the user B. By this near-field communication, the communication history information with the communication processing apparatus A stored in the storage unit of the communication processing apparatus B1 is transferred to the communication processing apparatus B2. The communication processing apparatus B2 stores the communication history information received from the communication processing apparatus B1 in the storage unit of the communication processing apparatus B2.

In step S407, the communication processing apparatus A is connected to the server, and issues to the server a registration request to register the user B as a "friend" of the user A. As described above, "friend" is one category of members who join the community provided and managed by the server. When issuing the registration request, the communication processing apparatus A uploads to the server the communication history data, which is a record of near-field communication with the communication processing apparatus B1, stored in the storage unit of the communication processing apparatus A. More specifically, the following data are acquired from the storage unit and transmitted to the server:

(a) the user ID of the user B (b) the nickname of the user B (any name (handle) set by the user B) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

In step S408, the communication processing apparatus B2 is connected to the server, and issues to the server a registration request to register the user B. This registration request is a registration request to register the user B as a "friend" of the user A. When issuing the registration request, the communication processing apparatus B2 uploads to the server the communication history data, which is a record of near-field communication with the communication processing apparatus A, transferred from the communication processing apparatus B1 and stored in the storage unit of the communication processing apparatus B2. More specifically, the following data are acquired from the storage unit and transmitted to the server:

(a) the user ID of the user A (b) the nickname of the user A (any name (handle) set by the user A) corresponding to the user ID (c) the data of the date and time when near-field communication was performed (d) the information on the position where near-field communication was performed (in a case where the communication processing apparatus is provided with a GPS)

Among the data (a) to (d), only the data (a) and (c) are necessary. The other data are not necessary. However, it is desirable that the other data also be transmitted if the other data have been acquired.

Furthermore, in step S409, the communication processing apparatus B2 is connected to the server, and transmits identification information (user ID) of the user B to the server. The user ID is an ID corresponding to the user B or an ID corresponding to the communication processing apparatus B1.

In step S410, the server compares the communication history data, which is a record of near-field communication, received from the communication processing apparatus A with the communication history data, which is a record of near-field communication, received from the communication processing apparatus B2.

The comparison processing includes, for example, the following data verification processing:

(x) verifying that the communication date and time recorded in the communication history data received from the communication processing apparatus A matches the communication date and time recorded in the communication history data received from the communication processing apparatus B2

(y) verifying that the user ID recorded in the communication history data received from the communication processing apparatus A is the same as the user ID corresponding to the user B (or the communication processing apparatus B1) received from the communication processing apparatus B2 and that the user ID recorded in the communication history data received from the communication processing apparatus B2 is the same as the user ID corresponding to the registered user A (or the communication processing apparatus A)

In step S410, the server performs the data verification processing (x) and (y). For example, in a case where information on the position where near-field communication was performed has been received from each of the communication processing apparatuses A and B2, the server checks whether the positional information received from the communication processing apparatus A matches the positional information received from the communication processing apparatus B2. Furthermore, if other data that can be subjected to comparison have been received, the server performs comparison of the data.

As described above, in step S410, by comparing the data received from the communication processing apparatus A with the data received from the communication processing apparatus B2, the server checks whether near-field communication has been performed between the communication processing apparatus A and the communication processing apparatus B1.

In a case where verification in step S410 is successful and it is verified that near-field communication has been performed between the communication processing apparatus A and the communication processing apparatus B1, the server registers the user B as a "friend" of the user A in step S411.

In step S412, the server transmits, to the communication processing apparatus A, a registration completion notification indicating that the user B has been registered as a "friend" of the user A. In step S413, the server transmits, to the communication processing apparatus B2, a registration completion notification indicating that the user B has been registered as a "friend" of the user A.

In the above description, the registration processing for the user A in steps S401 to S402 is performed as processing for registering an initial member of the community. However, this registration processing is not necessarily normal registration processing. The processing of steps S401 to S402 may be performed as interim registration processing for the user A and normal registration for the user A may be performed on condition that the sequence of steps S403 to S411 is completed. With such processing, meeting a registered user (in this case, the user B) in the real world is set as a requirement for user registration for the user A.

A plurality of processing sequences have been explained. As is clear from the above-described sequences, in community management processing according to an embodiment, when it is verified that users have performed near-field communication, the users can be registered as community members. In addition, when it is verified that an apparatus such as a cellular phone that can perform near-field communication has performed near-field communication with another communication processing apparatus, registration as a member of a community can be performed.

Namely, as described above, a user is permitted to join a community, for example, in a case where it is verified, in accordance with near-field communication history data, that a user satisfies any one of the following conditions (a) to (c):

(a) to have met a registered user in the real world
(b) to have been to a particular place or venue
(c) to have joined an event such as a particular meeting or party With application of a feature of an embodiment, for example, in a case where an apparatus that can perform near-field communication is installed in a supermarket or fast food restaurant and communication histories are exchanged between the apparatus and an apparatus owned by a user, the following advantages can be achieved:

Only customers who have visited a shop can be registered as members, and sale information, new products information, and the like can be provided to only such effective members who will visit the shop.
Opinions can be directly heard from customers.
This technology can be utilized as a marketing tool.

In addition, in a case where an apparatus that can perform near-field communication is installed in a concert or event venue (for example, a baseball field or a stadium) and communication histories are exchanged between the apparatus and an apparatus owned by a user, the following uses can be achieved:

A fan club composed of only persons who have been to the venue can be established.
Secret live information and exclusive goods information can be provided to registered members.
Customers who have been to the venue many times can be upgraded and treated as loyal customers.

In addition, an individual user who joins a community can enjoy the following advantages:
The user can be registered in an upgraded category as a friend in a community provision site.
The user can use an information source (group) properly.

Figure 6:
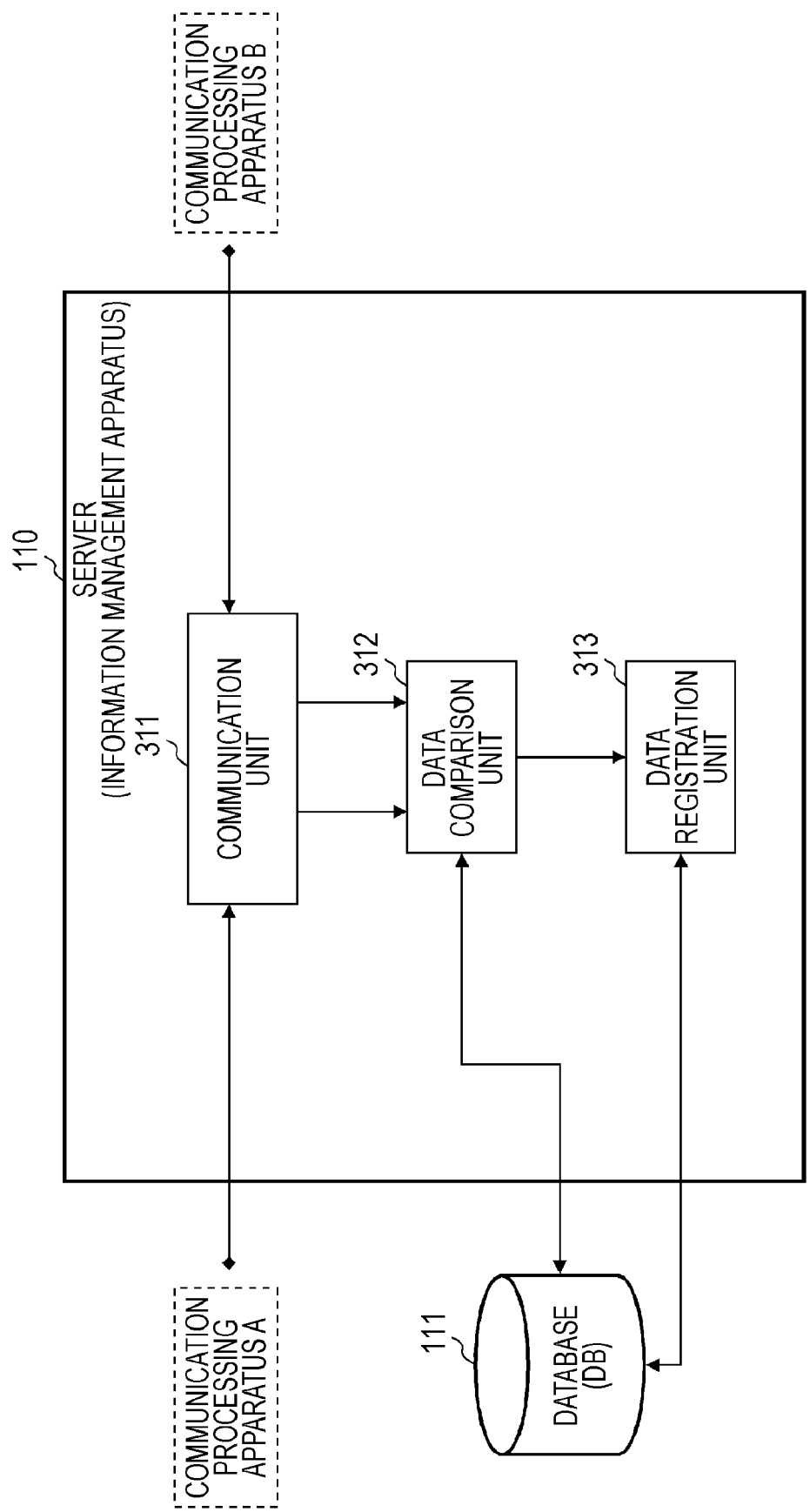
FIG. 6 is an explanatory diagram showing an example of the configuration of an information management apparatus (server) according to an embodiment.

FIG. 6 shows an example of the configuration of the server 110 serving as an information management apparatus that performs community management processing. The server 110 shown in FIG. 6 corresponds to the server 110 shown in FIG. 1. As shown in FIG. 6, the server 110 serving as an information management apparatus includes a communication unit 311, a data comparison unit 312, and a data registration unit 313.

The communication unit 311 receives, from a plurality of communication processing apparatuses, a plurality of pieces of communication history data of near-field communication performed in the plurality of communication processing apparatuses. The data comparison unit 312 performs comparison of the plurality of pieces of communication history data received by the communication unit 311. The data registration unit 313 performs processing for registering users of the plurality of communication processing apparatuses as community members in the database 111 on condition that it is verified by the data comparison unit 312, in accordance with the plurality of pieces of communication history data of the near-field communication, that near-field communication has been performed between the plurality of communication processing apparatuses.

The data comparison unit 312 determines, for example, in accordance with user IDs of communication processing apparatuses with which other communication processing apparatuses have performed near-field communication, the user IDs being included in communication history data received from the other communication processing apparatuses, whether near-field communication has been performed between the plurality of communication processing apparatuses.

In addition, the data comparison unit 312 performs verification processing for checking whether a plurality of pieces of data of a near-field communication date and time included in the plurality of pieces of communication history data received from the plurality of communication processing apparatuses match each other and checking whether a plurality of pieces of data of a near-field communication position included in the plurality of pieces of communication history data received from the plurality of communication processing apparatuses match each other. Accordingly, the data comparison unit 312 determines whether near-field communication has been performed between the plurality of communication processing apparatuses.

Specific embodiments have been described above. However, it is obvious that modifications or alterations of embodiments can be made to the present application by those skilled in the art without departing from the scope. That is, the present application has been disclosed by way of exemplary embodiments, and should not be construed in a limited manner. The scope should be determined with reference to the appended claims.

In addition, the series of processes described in the description can be implemented by hardware or software, or a combination thereof. When the series of processes is implemented by software, a program recording a processing sequence may be installed into an internal memory of a computer incorporated in dedicated hardware and executed, or may be installed onto a general-purpose computer capable of executing various types of processing and executed. For example, the program can be recorded in advance on a recording medium. The program can be installed onto a computer from the recording medium, or received from a network such as a local-area network (LAN) or the Internet, so that the computer can install the program into a recording medium such as an internal hard disk.

Note that various types of processing described in the description are not necessarily performed in a time series manner as described and may be performed in parallel or individually according to the performance of the apparatus that performs the processing or where necessary. In addition, the system referred to in the description represents a structure of a logical set of a plurality of apparatuses, and the apparatuses having individual configurations are not necessarily contained in a single housing.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information management apparatus comprising:
   a communication unit configured to receive, from a plurality of communication processing apparatuses, a plurality of pieces of communication history data of near-field communication performed in the plurality of communication processing apparatuses;
   a data comparison unit configured to perform comparison of the plurality of pieces of communication history data received by the communication unit; and
   a data registration unit configured to register a plurality of pieces of user information associated with the plurality of communication processing apparatuses as a group in a database on condition that it is verified by the data comparison unit, in accordance with the plurality of pieces of communication history data of the near-field communication, that near-field communication has been performed between the plurality of communication processing apparatuses.

2. The information management apparatus according to claim 1, wherein the data comparison unit is configured to determine, in accordance with, among the plurality of communication processing apparatuses, user IDs of communication processing apparatuses with which other communication processing apparatuses have performed near-field communication, the user IDs being included in a plurality of pieces of communication history data received from the other communication processing apparatuses, whether near-field communication has been performed between the plurality of communication processing apparatuses.

3. The information management apparatus according to claim 1, wherein the data comparison unit is configured to determine, in accordance with whether a plurality of pieces of data of a near-field communication date and time included in the plurality of pieces of communication history data received from the plurality of communication processing apparatuses match each other, whether near-field communication has been performed between the plurality of communication processing apparatuses.

4. The information management apparatus according to claim 1, wherein the data comparison unit is configured to determine, in accordance with whether a plurality of pieces of data of a near-field communication position included in the plurality of pieces of communication history data received from the plurality of communication processing apparatuses match each other, whether near-field communication has been performed between the plurality of communication processing apparatuses.

5. An information management method performed in an information management apparatus, the method comprising the steps of:
   receiving, by using a communication unit, from a plurality of communication processing apparatuses, a plurality of pieces of communication history data of near-field communication performed in the plurality of communication processing apparatuses;
   performing, by using a data comparison unit, comparison of the received plurality of pieces of communication history data; and
   registering, by using a data registration unit, a plurality of pieces of user information associated with the plurality of communication processing apparatuses as a group in a database on condition that it is verified, in accordance with the plurality of pieces of communication history data of the near-field communication, that near-field communication has been performed between the plurality of communication processing apparatuses.

6. A computer program product having instructions that when read by a CPU cause an information management apparatus to perform information management processing comprising the steps of:
   causing a communication unit to receive, from a plurality of communication processing apparatuses, a plurality of pieces of communication history data of near-field communication performed in the plurality of communication processing apparatuses;
   causing a data comparison unit to perform comparison of the received plurality of pieces of communication history data; and
   causing a data registration unit to register a plurality of pieces of user information on the plurality of communication processing apparatuses as a group in a database on condition that it is verified, in accordance with the plurality of pieces of communication history data of the near-field communication, that near-field communication has been performed between the plurality of communication processing apparatuses.

* * * * *